_United States Patent Office_

3,585,243
Patented June 15, 1971

3,585,243
PROCESS FOR THE PREPARATION OF ORTHO- AND PARA-DIHYDRIC PHENOLS FROM THE CORRESPONDING ORTHO- AND PARA-HYDROXY PHENALDEHYDES
Peter S. Gradeff, Somerset, N.J., assignor to Rhodia Inc., New York, N.Y.
No Drawing. Filed Nov. 21, 1968, Ser. No. 777,881
Int. Cl. C07c 39/08, 43/22
U.S. Cl. 260—613                10 Claims

ABSTRACT OF THE DISCLOSURE

A process is provided for oxidizing ortho- and para-hydroxy phenaldehydes to form ortho- and para-dihydric phenols, using hydrogen peroxide together with alkali metal carbonates or bicarbonates, or alkaline earth metal hydroxides.

---

This invention relates to a process for oxidizing ortho- and para-hydroxy phenaldehydes using hydrogen peroxide together with alkali metal carbonates or bicarbonates, or alkaline earth metal hydroxides, and more particularly to a process for the manufacture of pyrocatechol from salicyl aldehyde using hydrogen peroxide with alkali metal carbonates or bicarbonates, or alkaline earth metal hydroxides.

The Dakin reaction has been known since 1909, and has been successfully applied to the preparation of ortho- and para-dihydric phenols starting with the corresponding ortho- or para-hydroxy benzaldehydes, such as salicyl aldehyde, or phenones, such as acetophenone. The method as applied to the preparation of pyrocatechol from salicyl aldehyde was conceived by H. D. Dakin, American Chemical Journal 42 477 (1909). The classic preparation is described in Organic Syntheses Collective Volume I, pages 149 to 153. In brief, one mole of salicyl aldehyde is dissolved in 1000 cc. of 1 N sodium hydroxide at room temperature, and there is then added 1420 g. (1.2 moles) of 3% hydrogen peroxide. The solution is allowed to stand from fifteen to twenty hours, after which a few drops of acetic acid are added to neutralize excess alkali, and the solution is evaporated to dryness under reduced pressure to recover the pyrocatechol, which is purified by extraction and recrystallization from toluene. A 69 to 73% yield is obtained. However, this process presents several problems, which prevent its use commercially on a large scale. In the first place, a highly purified salicyl aldehyde is required. If the salicyl aldehyde is not purified through the bisulfite compound, the yields are 50% or less. Moreover, very large volumes of materials are employed, relative to the amounts of product. To obtain 70 to 76 g. of pyrocatechol, for example, it is necessary to work with nearly 2½ liters of reaction solutions and nearly ½ liter of recrystallization solvent.

Dakin reported that this procedure is applicable to almost all hydroxy aldehydes in which the hydroxyl and aldehyde (carbonyl) groups occupy ortho or para positions, relative to each other. With a few exceptions, no reaction takes place when the hydroxyl and carbonyl groups are meta to each other, nor does the reaction proceed with certain ortho and para compounds containing nitro groups and iodine atoms. The benzene rings can, however, contain a variety of other substituents, such as alkoxy groups, alkyl groups, cycloalkyl groups halogen, and additional hydroxyl groups, and they can also be attached to other benzene rings, either directly, as in 3,3'-diformyl-4,4'-dihydroxy-diphenyl, or through a linking group, as in 3,3'-diformyl-4,4'-dihydroxy-diphenyl methane, or condensed therewith, as in alpha-hydroxy-beta-formyl-naphthalene.

The procedure is also applicable to hydroxy phenones in which the hydroxyl and carbonyl groups occupy ortho or para positions relative to each other. For instance, ortho-hydroxy acetophenone and para-hydroxy acetophenone are capable of yielding catechol and hydroquinone, respectively, by the Dakin reaction. However, the yields tend to be less than with benzaldehydes.

As the alkali, Dakin suggested NaOH, KOH or NH$_4$OH. The first two alkalis have been used by subsequent workers, since NH$_4$OH has been found to be definitely inferior. Sodium peroxide, barium peroxide, benzoyl hydrogen peroxide, and Caro's acid can be used in lieu of hydrogen peroxide.

An extensive literature since 1909 has described application of the Dakin reaction to a variety of chemicals. Oliverio et al., Gazz. Chim. Ital. 80 267 (1950) describe the preparation of 1,4-dihydroxy-2-methoxy-5,6-dichlorobenzene from 5,6-dichlorovanillin. Row et al., Proceedings Indian Academy of Science 28A 98 (1948) prepared 3-methoxy - 7,8 - dihydroxyflavone from 3-methoxy-7-hydroxy-8-formyl-flavone. Naik et al. J. Org. Chem. 22 1626 (1957) prepared 5,6-dihydroxycoumarin from 5-formyl-6-hydroxycoumarin. Nikoforov et al. Izv. Akad. Nauk. SSSR Ser. Khim. (1964) (1) 176 prepared 2,6-dialkylhydroquinones from 4-hydroxy-3,5-dialkylbenzaldehydes. Ambekar et al. J. Indian Chem. Soc. 40 (12) 1041 (1963) prepared 2-bromo - 4' - methylflavone from 2-bromo-4-methyl-2-hydroxychalcone. Ahluwalia et al. J. Sci. Ind. Research (India) 19 B, 345 (1960) prepared 4-methyl-7-methoxy-8-hydroxy-coumarin from 4-methyl-7-methoxy-8-acetyl-coumarin. Yasuda J. Sci. Research Inst. (Tokyo) 52 83 (1958) prepared thymohydroquinone from 1-methyl-4-hydroxy-5-isopropyl-benzaldehyde. Seshadri et al. J. Chem. Soc. (1959) 1660 prepared 3,4-dimethoxy-6-methyl-pyrocatechol from 2,5-dihydroxy - 3,4 - dimethoxy-6-methyl-benzaldehyde. These illustrate the wide scope of the Dakin reaction.

Pyrocatechol can also be prepared by alkaline fusion or dry distillation of many natural substances, such as resins, ligins, and bituminous slates. It can be made by demethylation of guaiacol by heating in the presence of an aliphatic amine hydrochloride, as described in U.S. Pat. No. 2,100,228, or from phenol-2,4-disulfonate by fusion with alkali and hydrolysis. Important industrial methods are based on the fusion of ortho-chlorophenol or ortho-dichlorobenzene with alkali, usually barium or strontium hydroxide. The hydrolysis, however, is carried out at high temperatures, about 220° to 285° C. for ten hours in an autoclave, and in addition these processes necessitate the recovery of the barium or strontium salts. The technology of these processes is both difficult and expensive, as is pointed out by Kirk-Othmer in the Encyclopedia of Chemical Technology, volume 11, page 307 (First edition).

In accordance with the invention, pyrocatechol and other ortho- and para-dihydric phenols are prepared from phenaldehydes, in high yield. In fact, yields of approximately 95 to 100% are obtainable by the process of the invention, even when the starting phenaldehyde is in an impure crude or technical condition. Moreover, the process of the invention can be carried out at relatively high concentrations of the reactants. This advantage, coupled with the high yields obtainable, and the possibility of using impure starting materials, makes the process very attractive from a commercial standpoint, and quite superior to other procedures now in use, including the Dakin reaction. The process is of general application to the ortho- and para-hydroxy-phenaldehydes to which the Dakin reaction is applicable, but it is not effective with phenones, such as acetophenone.

In the process of the invention, the ortho- or para-hydroxy-phenaldehyde is reacted with hydrogen peroxide in the presence of an alkali metal carbonate or bicarbonate, or an alkaline earth metal hydroxide. The reaction is carried out in aqueous dispersion at moderate temperatures, and is complete in a few hours' time.

The reaction proceeds according to the following equations:

(1a) ortho

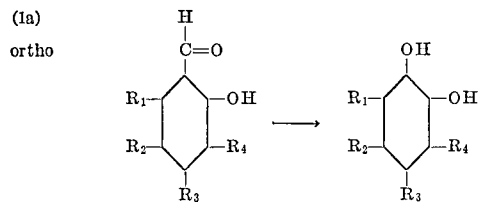

(b) para

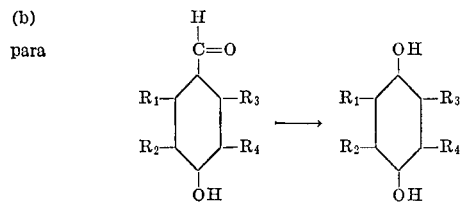

The following reaction mechanism has been proposed by Dakin for the Dakin reaction:

(2a) ortho

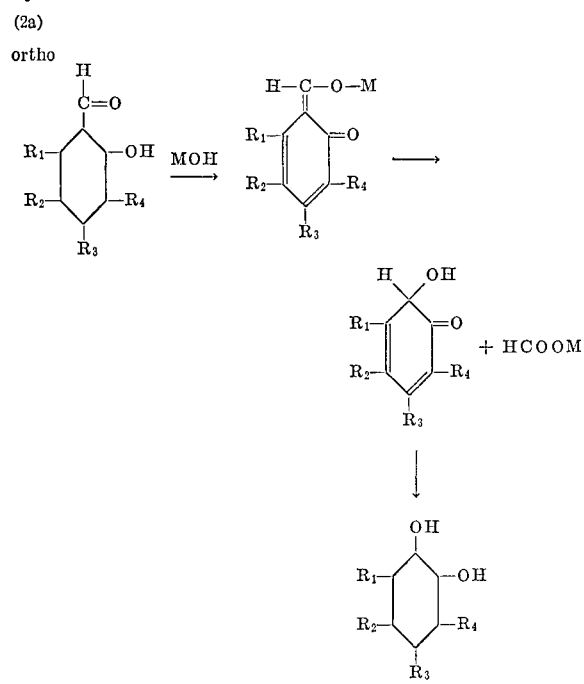

(b) para

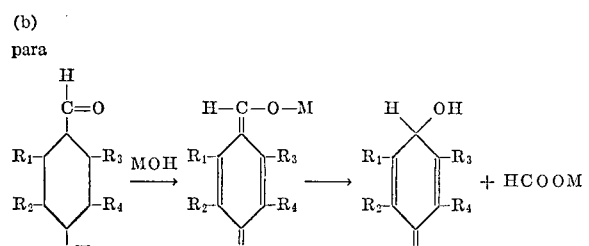

However, it is known that sodium bicarbonate does not react with phenols in this way, so that it is unlikely that this mechanism could be applicable in the process of this invention. In the light of more recent findings, a different mechanism for the Dakin reaction has been proposed:

(a)

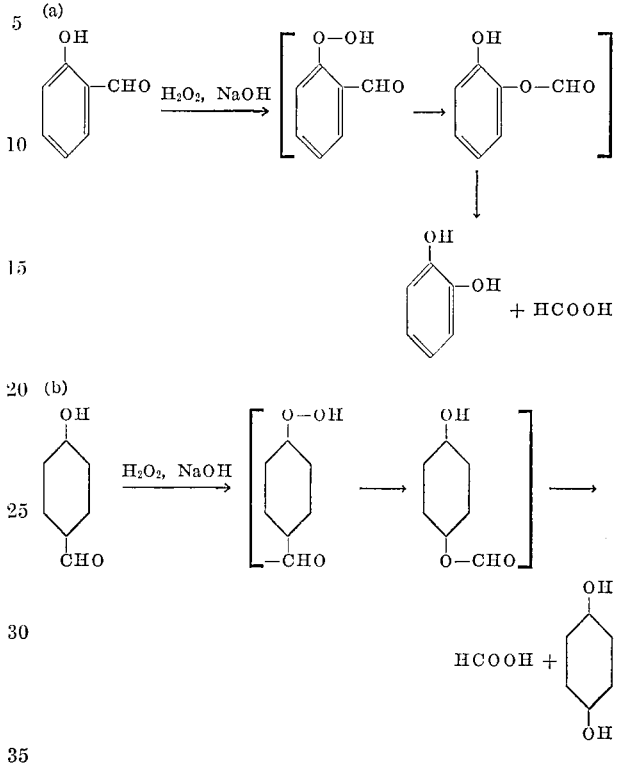

(b)

In this mechanism, salt formation is not postulated. It is possible that the alkali may intervene at a later stage, reacting with the postulated intermediate hydroperoxide, but of course this has not been established. However, this may explain better why alkali metal bicarbonates and carbonates are effective in the process of this invention.

If it is, this does not explain the improvement obtained by the process of the invention using alkali metal carbonates or bicarbonates or alkaline earth metal hydroxides, vis-à-vis the alkali metal hydroxides or ammonium hydroxide of the Dakin reaction.

The CHO radicals is lost in the course of the reaction, as HCOOM or (HCOO)$_2$M. $R_1$, $R_2$, $R_3$ and $R_4$ are hydrogen, halogen, or an organic radical.

The hydroxy ortho- or para-phenaldehyde has up to about twenty carbon atoms, including the R groups. The halogen can be chlorine, bromine, iodine and/or fluorine (iodine sometimes excepted).

The organic radical can be inert, and take no part in the reaction, such as hydrocarbon radicals, for instances, alkyl, aryl, and cycloalkyl; alkoxy, cycloalkoxy, phenoxy; hydroxy; and nitro (sometimes excepted). The organic radical can also include another aldehyde group, which can take part in the reaction if a hydroxyl group is ortho or para to it. These can be in the same ring, or in another phenyl ring, condensed therewith or attached thereto.

M is an alkali metal in $M_2CO_3$ and $MHCO_3$, and an alkaline earth metal in $M(OH)_2$.

The process is thus applicable to the preparation of any dihydric phenols having mononuclear or polynuclear condensed or separate ring systems, of which the following are illustrative:

(I)

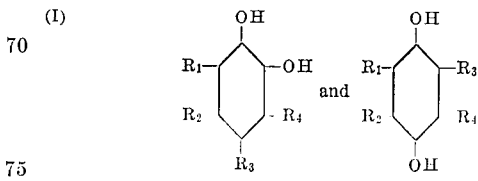

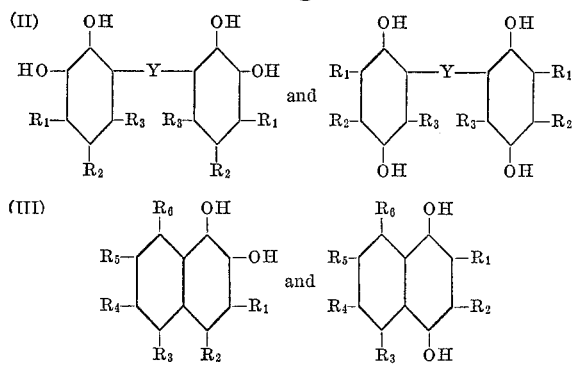

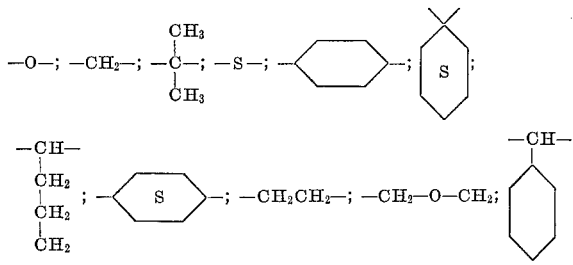

In these formulae, $R_1$, $R_2$, $R_3$, $R_4$, $R_5$ and $R_6$ are as $R_1$, $R_2$, $R_3$ and $R_4$ above. Y is a bivalent bond, as in diphenyl, or a bivalent linking radical, such as $$-O-;\ -CH_2-;\ -\underset{\underset{CH_3}{|}}{\overset{\overset{CH_3}{|}}{C}}-;\ -S-;\ -\!\!\bigcirc\!\!-;\ \underset{S}{\diagup\!\!\!\diagdown};$$

$$\underset{\underset{\underset{CH_2}{|}}{\underset{CH_2}{|}}}{\overset{\overset{-CH-}{|}}{CH_2}};\ -\!\underset{S}{\diagup\!\!\!\diagdown}\!-;\ -CH_2CH_2-;\ -CH_2-O-CH_2;\ \overset{-CH-}{\bigcirc}$$

Other more complex types are the formyl hydroxy coumarins, flavones, and chalcones.

Exemplary phenols that can be prepared are pyrocatechol, hydroquinone, 1,4-dihydroxy-2-methoxy-benzene, 5,6-dihydroxy-coumarin, 3-methyl-7,8-dihydroxy - flavone, thymohydroquinone, and 1,4-dihydroxy-2-methoxy-5,6-dichlorobenzene. Other phenols are illustrated in the examples.

The above reaction mechanism suggests that the alkali metal bicarbonate or carbonate or alkaline earth metal hydroxide reacts with the hydroxyphenaldehyde or with a possible hydroperoxide intermediate in stoichiometric proportions, and in fact, it is preferred to employ stoichiometric proportions of these compounds. Inasmuch as the alkali metal carbonates supply two equivalents of alkali metal, per mole, one-half mole of the alkali metal carbonate can be used per mole of the aldehyde. Similarly, the alkaline earth meal hydroxides contain, per mole, two equivalents of the alkaline earth metal, and consequently one-half mole of the alkaline earth metal hydroxide per mole of the aldehyde is employed. The alkali metal bicarbonates contain one equivalent of alkali metal per mole, and are used mole for mole.

While stoichiometric proportions are preferred, it may be desirable in some cases to employ an excess of the alkali metal carbonate or bicarbonate or alkaline earth metal hydroxide. These compounds can be employed in a molar ratio of about 0.25 to about 1.25 moles per mole of the aldehyde. More can be used, but is unnecessary; there is no critical upper limit, but optimum yields are obtained in amounts within the range stated.

As the alkali metal carbonate or bicarbonate, sodium carbonate, sodium bicarbonate, lithium carbonate, lithium bicarbonate, potassium carbonate and potassium bicarbonate are exemplary. Exemplary alkaline earth metal hydroxides are calcium hydroxide, barium hydroxide, strontium hydroxide and magnesium hydroxide. The alkaline earth metal oxides form the hydroxides in situ, and can also be used.

The hydrogen peroxide reacts in stoichiometric proportions, mole for mole, with the aldehyde. An excess of hydrogen peroxide can also be used, if desired, ranging up to approximately 1.25 mole hydrogen peroxide per mole of aldehyde. More can be used if desired. Less than the stoichiometric proportion down to 0.75 mole per mole can be used, but will reduce the yield, and the yield will then be based on the hydrogen peroxide. The concentration is not critical, and can range from 1% to 50%, or higher, but preferably is from 5 to 25% $H_2O_2$, because there is no practical advantage in higher concentrations.

In place of hydrogen peroxide, sodium peroxide, barium peroxide, benzoyl hydrogen peroxide and Caro's acid can be used, but they are less desirable, because no advantage is seen.

The reaction proceeds at a moderate temperature. It will in fact proceed at room temperature or slightly below (15–30° C.), although it may be somewhat slow. An increase in temperature to 35° C. greatly increases the reaction rate. At reaction temperatures within the range from about 40 to about 75° C. the reaction will be complete in as little as one hour, and certainly by the end of five hours. Higher temperatures can be used, usually, up to approximately the melting point (100° C.) of the mixture, if desired.

The reaction will proceed in good yield in a concentrated aqueous medium, which in fact is a dispersion of the reactants. Since it is wasteful of time and power to circulate large volumes of liquids, the amount of water or other solvent used is normally only that sufficient to dissolve or disperse the reactants, i.e., the hydroxy aldehyde, the hydrogen peroxide, and the alkali metal carbonate or bicarbonate or alkaline earth metal hydroxide.

Thus, depending upon the mode of feeding the reagents into the reaction vessel and also of possible use of solvents, the concentration of the reactants in the reaction mixture can range from about 10% to about 80% by weight.

The reaction proceeds in a dispersion of the reactants. A solution is not necessary. However, in some cases, particularly in the case of phenaldehydes and phenols of high molecular weight or polynuclear structure, an organic solvent can be added to aid in dissolving or dispersing the reactants and/or reaction product. A water-miscible solvent can be employed, for example, a water-miscible alcohol, such as methanol, ethanol or isopropanol, a lower aliphatic ketone, such as acetone or methyl ethyl ketone, dioxane, morpholine, pyridine or an alkanolamine, such as monoethanolamine, triethanolamine, or diethanolamine.

The reaction is carried out by dissolving or dispersing the alkali metal carbonate or bicarbonate or alkaline earth metal hydroxide in the reaction medium or liquid, such as in water. Then, the hydroxy phenaldehyde and hydrogen peroxide are added slowly and simultaneously. One may choose to feed the alkali meatl carbonate or bicarbonate or alkaline earth metal hydroxide simultaneously with the hydroxy phenaldehyde and hydrogen peroxide, thus reducing the initial amount of water in the reaction vessel. The reaction is exothermic, so the rate of addition is adjusted to keep the reaction under control, and maintain the reaction temperature within the desired range. External cooling can be applied to the reaction vessel, if desired.

Alternatively, the hydroxy phenaldehyde can be added to the reaction vessel, and the hydrogen peroxide added slowly, or too fast, without cooling. It is not, however, desirable to add all of the hydrogen peroxide at once, because the reaction will go out of control.

The reaction mixture should be stirred adequately throughout the reaction. After all the hydroxy phenaldehyde and hydrogen peroxide have been added, stirring is continued for the remainder of the reaction time.

Upon completion of the reaction, the reaction mixture is acidified, if necessary, in order to liberate any starting material or product, from possibly remaining as a salt with the metal of the base. Any suitable acid can be used. Sulfuric acid will give an insoluble precipitate with alkali earth metals, but it can be used. Also useful are hydrochloric acid, acetic acid, formic acid, trichloroacetic acid, phosphoric acid, and propionic acid. The dihydric phenol can then be filtered, or extracted using an organic solvent for the phenol that is water-immiscible, such as a dialkyl ether, for instance, diethyl ether or isoporpyl ether, ethyl acetate or mesityl oxide.

The dihydric and higher polyhydric phenols that are prepared in accordance with the invention are known compounds, and have known utilities. Pyrocatechol, for example, is used in bactericides, in the preparation of dyes and medicinal compounds, in photography, as an antioxidant for rubbers and plastics, and as a starting material for the synthesis of perfume ingredients.

The following examples in the opinion of the inventor represent preferred embodiments of the invention.

EXAMPLE 1

Sodium bicarbonate, 84 g. (1 mole) and 177 g. of water were charged into a four-necked reaction flask. Two dropping funnels were fitted into two necks of the flask, and a stirrer in the third neck. Then, with agitation, 122 g. (1 mole) of technical grade salicyl aldehyde and 1 mole of hydrogen peroxide (226 g. of 15% aqueous hydrogen peroxide) were added slowly but simultaneously from the dropping funnels into the reaction flask, over a period of thirty minutes. The temperature was maintained at 48 to 55° C. during the addition, by cooling with a cold water bath. The reaction mixture was then allowed gradually to cool to room temperature, under constant agitation, during about one hour.

The mixture was extracted several times with isopropyl ether, the isopropyl ether layer being recovered each time, and all the isopropyl ether extracts being combined. The isopropyl ether was removed by distillation, recovering a crude solid, which was vacuum distilled. There was thereby obtained 105 g. of pyrocatechol, boiling point 143° C. at 27 mm., melting point 103.5° C., 1.8 g. of salicyl aldehyde, and 2.5 g. of residue. The yield of pyrocatechol was therefore 95.5%. The melting point of pyrocatechol is 105° C., so that the product obtained was in a high state of purity.

EXAMPLE 2

Sodium carbonate, 1 mole (475 g. of a 22.3% aqueous solution) was charged into a reaction flask, and 244 g. (2 moles) of salicyl aldehyde, and 2 moles of hydrogen peroxide (453 g. of 15% aqueous hydrogen peroxide) were added slowly and simultaneously over a period of 45 minutes, while maintaining the reaction temperature at about 56° C. The reaction mixture was then allowed to cool slowly, with stirring, to room temperature, over one hour.

The mixture was acidified using a small amount of sulfuric acid, and extracted several times with isopropyl ether. The ether extracts were combined, and the solvent removed. A crude solid material was obtained (213 g.) and this was distilled under vacuum, recovering a total of 206.9 g. of pyrocatechol, representing a yield of 94%.

EXAMPLE 3

Calcium oxide, 57 g. (1 mole) and 400 g. of water were charged in a reaction flask, and then 244 g. (2 moles) of salicyl aldehyde and 2 moles of hydrogen peroxide (453.2 g. of 15% aqueous hydrogen peroxide) were dropped in simultaneously, with stirring, over a period of thirty minutes, while maintaining the reaction temperature at about 45° C. The reaction mixture was then allowed to cool slowly to room temperature, while stirring, over one hour.

The reaction was acidified with hydrochloric acid, and extracted several times with isopropyl ether. The ether extracts were combined, the ether removed, and the solid distilled under vacuum. A yield of 145 g. of pyrocatechol and 61.3 g. of unreacted salicyl aldehyde was obtained. This represents a yield of 88%, based on the salicyl aldehyde consumed.

EXAMPLE 4

Barium hydroxide octahydrate, 78 g. (1 mole) was charged with 100 g. of water into a reaction flask. There was then added simultaneously, dropwise, over a period of 45 minutes, 61 g. (0.5 mole) of salicyl aldehyde, and 0.46 mole of hydrogen peroxide (104.2 g. of a 15% aqueous solution), while maintaining the reaction temperature at 48 to 55° C. The reaction mixture was allowed to cool gradually to room temperature, with stirring, and then acidified with sulfuric acid to a pH of 3.5. The suspension was then extracted several times with isopropyl ether, and the ether extracts combined. The solvent was removed and the crude solid distilled under vacuum, whereupon 33 g. of pyrocatechol was obtained, together with 20 g. of salicyl aldehyde. This represents a yield of 90% of pyrocatechol, based on the salicyl aldehyde consumed.

EXAMPLE 5

Strontium hydroxide 60.8 g. (0.5 mole) was charged into a four-necked reaction flask, with 100 g. of water. Two of the other necks were equipped with dropping funnels, through which were added simultaneously, over a period of 45 minutes, 61 g. (0.5 mole) of salicyl aldehyde, and 0.5 mole of hydrogen peroxide (113.3 g. of 15% aqueous hydrogen peroxide), while maintaining the reaction temperature at about 45° C. The reaction mixture was then allowed to cool gradually to room temperature, with stirring, over one hour.

The reaction mixture was acidified with hydrochloric acid, and then extracted several times with isopropyl ether. The ether extracts were combined, and the ether removed by distillation. The solid was then distilled under vacuum. 25 g. of pyrocatechol was recover, together with 30 g. of unreacted salicyl aldehyde. This represents a yield of 92.5% pyrocatechol, based on the salicyl aldehyde consumed.

EXAMPLE 6

Sodium carbonate, 0.125 mole (59.4 g. of a 22% aqueous solution) was charged to a reaction flask, 2-hydroxy-3-ethoxy-benzaldehyde, 42 g. (0.25 mole) and 0.25 mole hydrogen peroxide (56.6 g. of a 15% aqueous hydrogen peroxide solution) were added dropwise, simultaneously, over a period of 45 minutes, while maintaining the reaction temperature at about 56° C. The reaction mixture was then allowed to cool slowly to room temperature, with stirring, after which the reaction mixture was acidified to a pH of 3.5 by addition of sulfuric acid. The reaction mixture was then extracted several times by isopropyl ether, and the ether extracts combined. The ether was then removed by vacuum distillation, whereupon 39 g. of a crude solid was obtained, which upon distillation under vacuum gave 37.5 g. of pyrogallol 1-ethyl ether, melting point 93 to 94° C., and 1.5 g. of residue. This represents a yield of 97.5%.

EXAMPLE 7

Into a reaction flask was charged 0.125 mole of sodium carbonate (59.4 g. of a 22% aqueous sodium carbonate solution). There was then added dropwise, over a period of 45 minutes, 80 g. (0.5 mole) of 2-hydroxy-3-methoxy benzaldehyde, and 0.5 mole hydrogen peroxide (113.3 g. of a 15% aqueous hydrogen peroxide solution), while maintaining the reaction temperature at about 56° C. The reaction mixture was then allowed to cool slowly at room temperature, with stirring, after which sulfuric acid was added, to bring the pH to 3.5. The mixture was then extracted several times with isopropyl ether, the ether extracts combined, and the ether removed under vacuum distillation. The crude product that was recovered was then distilled under vacuum, whereupon pyrogallol 1-methyl ether, melting point 39 to 41° C., was obtained in a 98% yield.

EXAMPLE 8

Into a reaction flask was charged 0.125 mole of sodium carbonate (59.4 g. of a 22% aqueous sodium carbonate solution), after which there was added simultaneously, and dropwise, over a period of 45 minutes, 0.25 mole of vanillin, and 0.25 mole of hydrogen peroxide (as a 15% aqueous hydrogen peroxide solution), while maintaining the reaction temperature at about 56° C. The reaction mixture was allowed to cool slowly to room temperature, and then a small amount of sulfuric acid was added to bring the pH to 3.5. The reaction mixture was then extracted with several washes of isopropyl ether, and the ether removed by vacuum distillation. The crude product that was recovered was distilled under vacuum, whereupon 30 g. of 2-methoxy-hydroquinone, melting point 88° C., was obtained, in a yield of 86%.

EXAMPLE 9 p-Hydroxy benzaldehyde 0.25 mole was reacted with 0.125 mole of sodium carbonate in 40 g. water and 0.25 mole hydrogen peroxide (15% solution) as described in the examples above, and gave 26.5 g. hydroquinone, melting point 170–172° C., yield 93%.

Having regard to the foregoing disclosure, the following is claimed as the inventive and patentable embodiments thereof:

1. A process for the preparation of ortho- and para-dihydric phenols having up to about nineteen carbon atoms which comprises reacting an ortho- or para-hydroxy aromatic aldehyde having up to about twenty carbon atoms and one of the formulae:

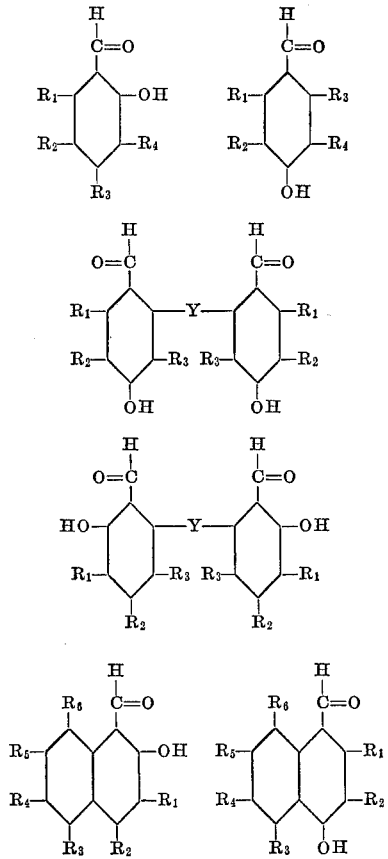

wherein $R_1$, $R_2$, $R_3$, $R_4$, $R_5$ and $R_6$ are selected from hydrogen; halogen; hydroxyl; alkyl, cycloalkyl, aryl, alkoxy, phenoxy, cycloalkoxy, and such groups including another phenolic group; nitro; formyl and acyl; and Y is selected from a bivalent bond or a bivalent linking radical selected from oxygen, sulfur, alkylene, cyclohexylene, phenylene, and oxyalkylene and methylene phenyl, with hydrogen peroxide at a concentration within the range from about 1 to about 50% $H_2O_2$ in a molar ratio within the range from about 0.75 to about 1.25 moles $H_2O_2$ per mole of aromatic aldehyde in the presence of an alkali metal carbonate or bicarbonate, or an alkaline earth metal hydroxide, in aqueous solution or dispersion at a temperature within the range from about 15 to about 100° C.

2. A process according to claim 1, in which the reaction is effected at from 40° to 75° C.

3. A process according to claim 1, which comprises adding the hydroxy aromatic aldehyde and the hydrogen peroxide simultaneously to an aqueous solution or dispersion of the alkali metal carbonate or bicarbonate, or alkaline earth metal hydroxide.

4. A process according to claim 1, in which the aromatic aldehyde is an ortho- or para-hydroxy benzaldehyde.

5. A process according to claim 1, in which the aromatic aldehyde is an ortho- or para-hydroxy alkoxy benzaldehyde.

6. A process according to claim 1, in which the alkali is an alkali metal carbonate or bicarbonate.

7. A process according to claim 1, in which the alkali is an alkaline earth metal hydroxide.

8. A process according to claim 1, in which the hydroxy aromatic aldehyde has one of the formulae:

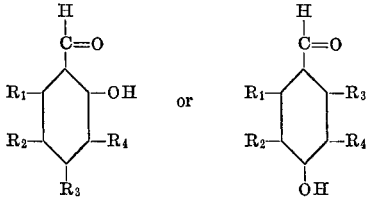

9. A process according to claim 1, in which the alkali metal carbonate or bicarbonate or alkaline earth metal hydroxide is in a molar ratio of about 0.25 to about 1.25 moles per mole of the aldehyde.

10. A process according to claim 1, in which the reactants in the reaction mixture are in a concentration within the range from about 10% to about 80% by weight.

References Cited

Dakin: American Chemical Journal, vol. 42 (1909), pp. 477–487.

BERNARD HELFIN, Primary Examiner

U.S. Cl. X.R.

260—621, 619, 609, 592, 622, 623, 625, 620, 526